(12) United States Patent
Whitcomb et al.

(10) Patent No.: US 8,613,888 B2
(45) Date of Patent: *Dec. 24, 2013

(54) NANOWIRE PREPARATION METHODS, COMPOSITIONS, AND ARTICLES

(75) Inventors: David R. Whitcomb, Woodbury, MN (US); William D. Ramsden, Afton, MN (US); Doreen C. Lynch, Afton, MN (US)

(73) Assignee: Carestream Health, Inc., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/275,496

(22) Filed: Oct. 18, 2011

(65) Prior Publication Data

US 2012/0128529 A1    May 24, 2012

Related U.S. Application Data

(60) Provisional application No. 61/416,425, filed on Nov. 23, 2010.

(51) Int. Cl.
*C22C 5/06* (2006.01)
*C22C 1/00* (2006.01)

(52) U.S. Cl.
USPC .............................. 420/591; 75/711; 75/392

(58) Field of Classification Search
USPC ..................... 420/591; 75/711, 392
See application file for complete search history.

(56) References Cited

U.S. PATENT DOCUMENTS

| 2004/0086646 | A1 | 5/2004 | Brandes et al. |
| 2006/0068025 | A1 | 3/2006 | Chang et al. |
| 2008/0003130 | A1 | 1/2008 | Xia et al. |
| 2009/0196788 | A1* | 8/2009 | Wang et al. .................... 420/501 |
| 2009/0226753 | A1 | 9/2009 | Naoi |
| 2010/0002282 | A1* | 1/2010 | Agrawal et al. ............... 359/275 |

FOREIGN PATENT DOCUMENTS

| CN | 101934377 | 9/2010 |
| CN | 102029400 | 11/2010 |
| JP | 2008-13798 | 1/2008 |
| JP | 2009-155674 | 7/2009 |
| WO | WO 2008/105456 | 9/2008 |
| WO | WO 2009/128973 | 10/2009 |

OTHER PUBLICATIONS

Y. Xia et al., "Shape-Controlled Synthesis of Metal Nanocrystals: Simple Chemistry Meets Complex Physics?", Nanostructures, Angew. Chem. Int. Ed., 2009, vol. 48, pp. 60-103.

J. Jiu et al., "Preparation of Ag nanorods with high yield by polyol process", Materials Chemistry and Physics, vol. 114, 2009, pp. 333-338.

S. Nandikonda, "Microwave Assisted Synthesis of Silver Nanorods", Auburn, Alabama, Aug. 9, 2010, 59 pages.

S. Nandikonda et al., "Effects of Salt Selection on the Rapid Synthesis of Silver Nanowires", Abstract INOR0299, 240th ACS National Meeting, Boston, MA, Aug. 22-27, 2010, 1 page.

Y.C. Lu et al., "Tailoring of silver wires and their performance as transparent conductive coatings", Nanotechnology, vol. 21, 2010, 215707, pp. 1-6.

* cited by examiner

*Primary Examiner* — Rebecca Lee
(74) *Attorney, Agent, or Firm* — Reed L. Christiansen

(57) ABSTRACT

Nanowire preparation methods, compositions, and articles are disclosed. Such nanowires may be thicker than other nanowires and may be useful in devices requiring high electrical current densities.

7 Claims, 7 Drawing Sheets

NANOWIRE PREPARATION METHODS, COMPOSITIONS, AND ARTICLES

CROSS REFERENCE TO RELATED APPLICATIONS

This application claims benefit of U.S. Provisional Application No. 61/416,425, filed Nov. 23, 2010, entitled MIXED METAL OR METAL ION CATALYSIS OF METAL ION REDUCTION, METHODS, COMPOSITIONS, AND ARTICLES, which is hereby incorporated by reference in its entirety.

BACKGROUND

The general preparation of silver nanowires (10-200 aspect ratio) is known. See, for example, *Angew. Chem. Int. Ed.* 2009, 48, 60, Y. Xia, Y. Xiong, B. Lim, S. E. Skrabalak, which is hereby incorporated by reference in its entirety. Such preparations typically employ $Fe^{2+}$ or $Cu^{2+}$ ions to "catalyze" the wire formation over other morphologies. The controlled preparation of silver nanowires having desired lengths and widths, however, is not known. For example, the $Fe^{2+}$ produces a wide variety of lengths or thicknesses and the $Cu^{2+}$ produces wires that are too thick for many applications.

The metal ions used to catalyze wire formation are generally primarily reported to be provided as a metal halide salt, usually as a metal chloride, for example, $FeCl_2$ or $CuCl_2$. See, for example, J. Jiu, K. Murai, D. Kim, K. Kim, K. Suganuma, *Mat. Chem. & Phys.*, 2009, 114, 333, which refers to NaCl, $CoCl_2$, $CuCl_2$, $NiCl_2$ and $ZnCl_2$; Japanese patent application publication JP2009155674, which describes $SnCl_4$; S. Nandikonda, "Microwave Assisted Synthesis of Silver Nanorods," M. S. Thesis, Auburn University, Aug. 9, 2010, which refers to NaCl, KCl, $MgCl_2$, $CaCl_2$, $MnCl_2$, $CuCl_2$, and $FeCl_3$; S. Nandikonda and E. W. Davis, "Effects of Salt Selection on the Rapid Synthesis of Silver Nanowires," Abstract INOR-299, 240th ACS National Meeting, Boston, Mass., Aug. 22-27, 2010, which discloses NaCl, KCl, $MgCl_2$, $CaCl_2$, $MnCl_2$, $CuCl_2$, $FeCl_3$, $Na_2S$, and NaI; Chinese patent application publication CN101934377, which discloses $Mn^{2+}$; Y. C. Lu, K. S. Chou, *Nanotech.*, 2010, 21, 215707, which discloses $Pd^{2+}$; and Chinese patent application publication CN102029400, which discloses NaCl, $MnCl_2$, and $Na_2S$.

SUMMARY

At least some embodiments provide a method comprising: providing a composition comprising at least one first reducible metal ion, at least one second metal or metal ion, and at least one third metal or metal ion, where the at least one second metal or metal ion differs in atomic number from that of the at least one first reducible metal ion, and the at least one third metal or metal ion differs in atomic number from both the at least one first reducible metal ion and the at least one second metal or metal ion.

In at least some embodiments, the composition further comprises at least one compound comprising the at least one first reducible metal ion.

In some cases, the composition further comprises one or more of: at least one solvent, or one or more surfactants, or one or more acids, or one or more polar polymers. Such solvents, when used, may, for example, comprise at least one polyol. Such polar polymers, when used, may, for example, comprise polyvinylpyrrolidinone.

In at least some embodiments, the at least one first reducible metal ion comprises at least one of: at least one coinage metal ion, at least one ion of an element from IUPAC Group 11, or at least one ion of silver.

In some such methods, the at least one second metal or metal ion comprises the at least one second metal in its 0, +1, +2, +3, +4, +5, or +6 oxidation state. In some cases, the at least one third metal or metal ion comprises the at least one third metal in its 0, +1, +2, +3, +4, +5, or +6 oxidation state.

In at least some embodiments, the at least one second metal or metal ion or the at least on third metal or metal ion may comprise at least one transition metal or ion of a transition metal. In at least some embodiments, both the at least one second metal or metal ion and the at least one third metal or metal ion each comprise at least one transition metal or ion of a transition metal.

In some such methods, the at least one second metal or metal ion comprises at least one transition metal or ion of a transition metal and the at least one third metal or metal ion comprises at least one element from IUPAC Group 14 or ion of an element from IUPAC Group 14.

In at least some embodiments, the at least one second metal or metal ion comprises at least one of: iron, an ion of iron, cobalt, an ion of cobalt, manganese, an ion of manganese, tin, an ion of tin, germanium, or an ion of germanium.

Other embodiments provide the at least one first metal produced by such methods. In at least some embodiments, such an at least one first metal may comprise one or more nanowires, nanocubes, nanorods, nanopyramids, or nanotubes.

Still other embodiments provide articles comprising the at least one first metal produced by such methods.

These embodiments and other variations and modifications may be better understood from the brief description of figures, description, exemplary embodiments, examples, figures, and claims that follow. Any embodiments provided are given only by way of illustrative example. Other desirable objectives and advantages inherently achieved may occur or become apparent to those skilled in the art. The invention is defined by the appended claims.

DESCRIPTION

Figure 1:
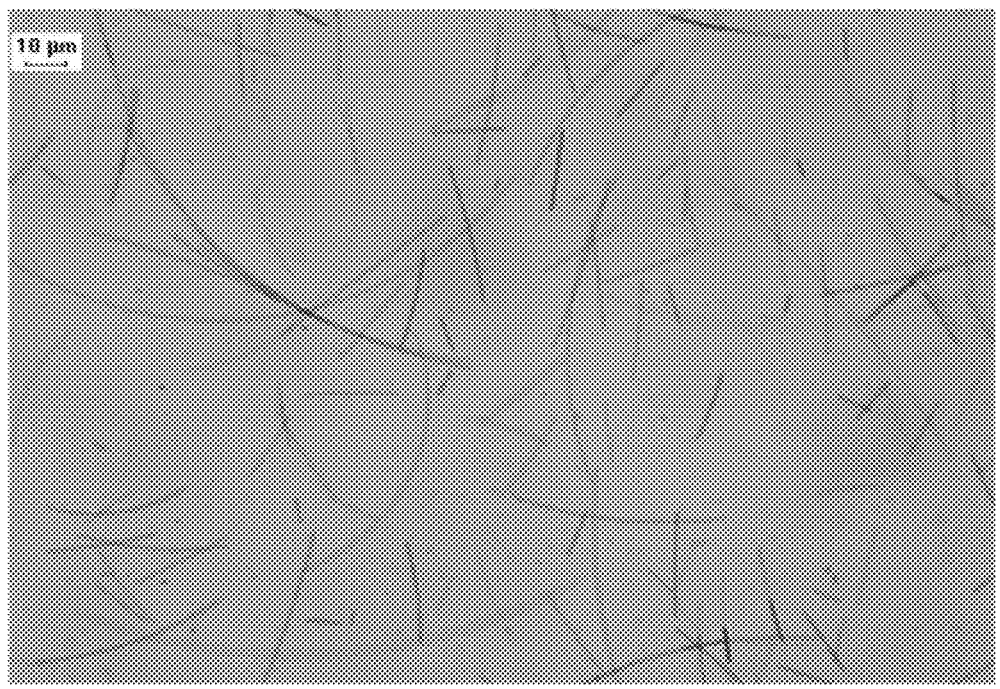
FIG. 1 shows an optical micrograph of the product of comparative Example 1.

All publications, patents, and patent documents referred to in this document are incorporated by reference herein in their entirety, as though individually incorporated by reference.

U.S. Provisional Application No. 61/416,425, filed Nov. 23, 2010, entitled MIXED METAL OR METAL ION CATALYSIS OF METAL ION REDUCTION, METHODS, COMPOSITIONS, AND ARTICLES, is hereby incorporated by reference in its entirety.

Applicants have recognized that a mixture of metals or metal ions, such as, for example, $Fe^{2+}$ with $Co^{2+}$, or $Sn^{2+}$ with $Mn^{2+}$, or $Sn^{2+}$ with $Ge^{2+}$, can be used to control the aspect ratios of silver nanowires. Nanowires made in the presence of such a mixture of metals or metal ions may be thicker than other nanowires and may be useful in devices requiring high electrical current densities.

The methods are also believed to be applicable to reducible metal cations other than silver cations, including, for example, reducible cations of other IUPAC Group 11 elements, reducible cations of other coinage metals, and the like. The methods may, in some embodiments, employ a mixture of more than two metals or metal ions, such as, for example, a mixture of three, four, or more metals or metal ions. The metals or metal ions may be in the same or different oxidation states from each other. For example, one or more metals or metal ions may be in their 0, +1, +2, +3, +4, +5, +6, or higher oxidation states, while one or more other metal ions may be in the same or different oxidation states.

The methods may also be used to prepare products other than nanowires, such as, for example, nanocubes, nanorods, nanopyramids, nanotubes, and the like. Such products may be incorporated into articles, such as, for example, transparent electrodes, solar cells, light emitting diodes, other electronic devices, medical imaging devices, medical imaging media, and the like.

Reducible Metal Ions and Metal Products

Some embodiments provide methods comprising reducing at least one reducible metal ion to at least one metal. A reducible metal ion is a cation that is capable of being reduced to a metal under some set of reaction conditions. In such methods, the at least one first reducible metal ion may, for example, comprise at least one coinage metal ion. A coinage metal ion is an ion of one of the coinage metals, which include copper, silver, and gold. Or such a reducible metal ion may, for example, comprise at least one ion of an IUPAC Group 11 element. An exemplary reducible metal ion is a silver cation. Such reducible metal ions may, in some cases, be provided as salts. For example, silver cations might, for example, be provided as silver nitrate.

In such embodiments, the at least one metal is that metal to which the at least one reducible metal ion is capable of being reduced. For example, silver would be the metal to which a silver cation would be capable of being reduced.

Mixtures of Metals or Metal Ions

In some embodiments, the reduction of the reducible metal ion occurs in the presence of at least one second metal or metal ion and at least one third metal or metal ion, where the at least one second metal or metal ion differs in atomic number from the at least one first reducible metal ion, and where the at least one third metal or metal ion differs in atomic number from both the at least one first reducible metal ion and the at least one second metal or metal ion.

In general, the at least one second metal or metal ion and the at least one third metal or metal ion may, by themselves or in combination with other metals or metal ions, be referred to as a mixture of metals or metal ions. Such a mixture of metals or metal ions may comprise only metals, or only metal ions, or both metals and metal ions. Non-limiting examples of such mixtures include $Fe^{2+}$ with $Co^{2+}$, or $Sn^{2+}$ with $Mn^{2+}$, or $Sn^{2+}$ with $Ge^{2+}$. The mixture may comprise more than two metals or metal ions, such as, for example, a mixture of three, four, or more metals or metal ions. The metals or metal ions may be in the same or different oxidation states from each other. For example, one or more metals or metal ions may be in their 0, +1, +2, +3, +4, +5, +6, or higher oxidation states, while one or more other metals or metal ions may be in the same or different oxidation states.

In some embodiments, the mixture of metals or metal ions may comprise no metal ions but only metals that are not ions, such as, for example, metal carbonyls. In still other cases, the mixture of metals or metal ions may comprise only metal ions. In yet still other cases, the mixture of metals or metal ions may comprise both metals and metal ions. For example, the one or more metals or metal ions may all be in their +1, +2, +3, +4, +5, +6 or higher oxidation states, or the one or more metals or metal ions may all be metals in their 0 oxidation state, or the one or more metal or metal ions may comprise one or more metal ions in their +1, +2, +3, +4, +5, +6 or higher oxidation states and one or more metals in their 0 oxidation state.

Nanowires made in the presence of such a mixture of metals or metal ions may be thicker than other nanowires and may be useful in devices requiring high electrical current densities.

Preparation Methods

A common method of preparing nanostructures, such as, for example, nanowires, is the "polyol" process. Such a process is described in, for example, *Angew. Chem. Int. Ed.* 2009, 48, 60, Y. Xia, Y. Xiong, B. Lim, S. E. Skrabalak, which is hereby incorporated by reference in its entirety. Such processes typically reduce a metal cation, such as, for example, a silver cation, to the desired metal nanostructure product, such as, for example, a silver nanowire. Such a reduction may be carried out in a reaction mixture that may, for example, comprise one or more polyols, such as, for example, ethylene glycol (EG), propylene glycol, butanediol, glycerol, sugars, carbohydrates, and the like; one or more protecting agents, such as, for example, polyvinylpyrrolidinone (also known as polyvinylpyrrolidone or PVP), other polar polymers or copolymers, surfactants, acids, and the like; and one or more metal ions. These and other components may be used in such reaction mixtures, as is known in the art. The reduction may, for example, be carried out at one or more temperatures from about 120° C. to about 190° C., or from about 80° C. to about 190° C.

Nanostructures, Nanostructures, and Nanowires

In some embodiments, the metal product formed by such methods is a nanostructure, such as, for example, a one-dimensional nanostructure. Nanostructures are structures having at least one "nanoscale" dimension less than 300 nm, and at least one other dimension being much larger than the nanoscale dimension, such as, for example, at least about 10 or at least about 100 or at least about 200 or at least about 1000 times larger. Examples of such nanostructures are nanorods, nanowires, nanotubes, nanopyramids, nanoprisms, nanoplates, and the like. "One-dimensional" nanostructures have one dimension that is much larger than the other two dimensions, such as, for example, at least about 10 or at least about 100 or at least about 200 or at least about 1000 times larger.

Such one-dimensional nanostructures may, in some cases, comprise nanowires. Nanowires are one-dimensional nanostructures in which the two short dimensions (the thickness dimensions) are less than 300 nm, preferably less than 100 nm, while the third dimension (the length dimension) is greater than 1 micron, preferably greater than 10 microns, and the aspect ratio (ratio of the length dimension to the larger of the two thickness dimensions) is greater than five. Nanowires are being employed as conductors in electronic devices or as elements in optical devices, among other possible uses. Silver nanowires are preferred in some such applications.

Such methods may be used to prepare nanostructures other than nanowires, such as, for example, nanocubes, nanorods, nanopyramids, nanotubes, and the like. Nanowires and other nanostructure products may be incorporated into articles, such as, for example, electronic displays, touch screens, portable telephones, cellular telephones, computer displays, laptop computers, tablet computers, point-of-purchase kiosks, music players, televisions, electronic games, electronic book readers, transparent electrodes, solar cells, light emitting diodes, other electronic devices, medical imaging devices, medical imaging media, and the like.

EXEMPLARY EMBODIMENTS

U.S. Provisional Application No. 61/416,425, filed Nov. 23, 2010, entitled MIXED METAL OR METAL ION CATALYSIS OF METAL ION REDUCTION, METHODS, COMPOSITIONS, AND ARTICLES, which is hereby incorporated by reference in its entirety, disclosed the following 39 non-limiting exemplary embodiments:

A. A method comprising:
providing a composition comprising:
at least one compound comprising at least one first reducible metal ion,
at least one second metal or metal ion, said at least one second metal or metal ion differing in atomic number from said at least one first reducible metal ion,
at least one third metal or metal ion, said at least one third metal or metal ion differing in atomic number from said at least one first reducible metal ion and from said at least one second metal or metal ion,
and at least one solvent; and
reducing the at least one first reducible metal ion to at least one first metal.

B. The method of embodiment A, wherein the composition further comprises at least one protecting agent.

C. The method of embodiment B, wherein the at least one protecting agent comprises at least one of: one or more surfactants, one or more acids, or one or more polar polymers.

D. The method of embodiment B, wherein the at least one protecting agent comprises polyvinylpyrrolidinone.

E. The method of embodiment B, further comprising inserting the at least one protecting agent.

F. The method of embodiment A, wherein the composition further comprises at least one fourth metal or metal ion, said at least one fourth metal differing in atomic number from said at least one first reducible metal ion, from said at least one second metal or metal ion, and from at least one third metal or metal ion.

G. The method of embodiment A, wherein the at least one first reducible metal ion comprises at least one coinage metal ion.

H. The method of embodiment A, wherein the at least one first reducible metal ion comprises at least one ion of an element from IUPAC Group 11.

J. The method of embodiment A, wherein the at least one first reducible metal ion comprises at least one ion of silver.

K. The method of embodiment A, wherein the at least one compound comprises silver nitrate.

L. The method of embodiment A, wherein the at least one second metal or metal ion comprises the at least one second metal in its 0, +1, +2, +3, +4, +5, or +6 valence state.

M. The method of embodiment L, wherein the at least one third metal or metal ion comprises the at least one third metal in its 0, +1, +2, +3, +4, +5, or +6 valence state.

N. The method of embodiment A, wherein the at least one compound comprises at least one salt of said at least one second metal or metal ion or of said at least one third metal or metal ion.

P. The method of embodiment N, wherein the at least one salt comprises at least one chloride.

Q. The method of embodiment A, wherein the at least one second metal or metal ion comprises at least one transition metal or ion of a transition metal.

R. The method of embodiment Q, wherein the at least one third metal or metal ion comprises at least one transition metal or ion of a transition metal.

S. The method if embodiment Q, wherein the at least one third metal comprises at least one element or ion of an element from IUPAC Group 14.

T. The method of embodiment A, wherein the at least one second metal or metal ion or the at least one third metal or metal ion comprises iron or an ion of iron.

U. The method of embodiment A, wherein the at least one second metal or metal ion or the at least one third metal or metal ion comprises cobalt or an ion of cobalt.

V. The method of embodiment A, wherein the at least one second metal or metal ion comprises iron or an ion of iron and the at least one third metal or metal ion comprises cobalt or an ion of cobalt.

W. The method of embodiment A, wherein the at least one second metal or metal ion or the at least one third metal or metal ion comprises manganese or an ion of manganese.

X. The method of embodiment A, wherein the at least one second metal or metal ion or the at least one third metal or metal ion comprises tin or an ion of tin.

Y. The method of embodiment A, wherein the at least one second metal or metal ion comprises manganese or an ion of manganese and the at least one third metal or metal ion comprises tin or an ion of tin.

Z. The method of embodiment A, wherein the at least one solvent comprises at least one polyol.

AA. The method of embodiment A, wherein the at least one solvent comprises at least one of: ethylene glycol, propylene glycol, glycerol, one or more sugars, or one or more carbohydrates.

AB. The method of embodiment A, wherein the composition has a ratio of the total moles of the at least one second metal or metal ion and the at least one third metal or metal ion to the moles of the at least one first reducible metal ion from about 0.0001 to about 0.1.

AC. The method of embodiment A, wherein the composition has a molar ratio of the at least one second metal or metal ion to the at least one third metal or metal ion from about 0.01 to about 100.

AD. The method of embodiment A, wherein the reduction is carried out at one or more temperatures from about 120° C. to about 190° C.

AE. The method of embodiment A, further comprising inserting one or more of: the composition, the at least one compound comprising at least one first reducible metal ion, the at least one second metal or metal ion, the at least one third metal or metal ion, or the at least one solvent.

AF. The at least one first metal produced according to the method of embodiment A.

AG. At least one article comprising the at least one first metal produced according to the method of embodiment A.

AH. The at least one article of embodiment AG, wherein the at least one first metal comprises one or more nanowires, nanocubes, nanorods, nanopyramids, or nanotubes.

AJ. The at least one article of embodiment AG, wherein the at least one first metal comprises at least one object having an average diameter of between about 10 nm and about 500 nm.
AK. The at least one article of embodiment AG, wherein the at least one first metal comprises at least one object having an aspect ratio from about 50 to about 10,000.
AL. At least one metal nanowire with an average diameter of between about 10 nm and about 150 nm, and with an aspect ratio from about 50 to about 10,000.
AM. The nanowire of embodiment AL, wherein the at least one metal comprises at least one coinage metal.
AN. The nanowire of embodiment AL, wherein the at least one metal comprises at least one element of IUPAC Group 11.
AP. The nanowire of embodiment AL, wherein the at least one metal comprises silver.
AQ. At least one article comprising the at least one metal nanowire of embodiment AL.

EXAMPLES

Example 1 (Comparative)

To a 500 mL reaction flask containing 200 mL ethylene glycol (EG), 1.2 mL of 7.0 mM $FeCl_2$ in EG was added and degassed with argon using a glass pipette. Stock solutions of 0.77 M polyvinylpyrrolidinone (PVP, 55,000 molecular weight) in EG and 0.25 M $AgNO_3$ in EG were also degassed with argon. 60 mL syringes of the PVP and $AgNO_3$ solutions were then prepared. The reaction mixture was heated to 145° C. under $N_2$ and, after the reaction mixture was held 10 minutes at the set point temperature, the $AgNO_3$ and PVP solutions were added at a constant rate over 25 minutes via a 20 gauge TEFLON® fluoropolymer syringe needle. The reaction mixture was held at 145° C. for 90 minutes, after which samples were taken for optical microscopy. The reaction mixture was then quenched in an ice bath, after which samples were taken for scanning electron microscopy.

Figure 2:
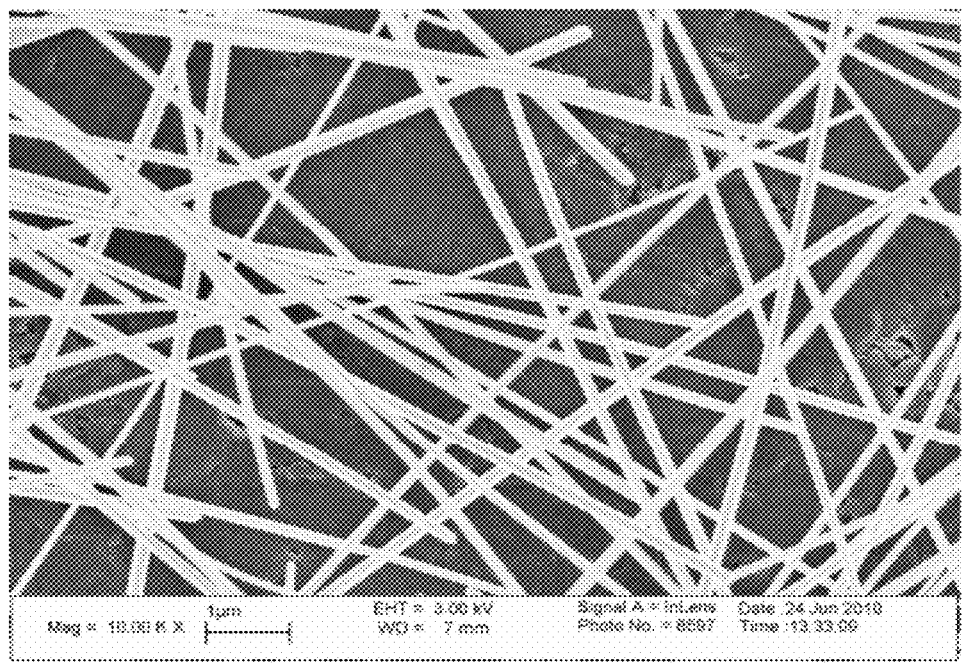
FIG. 2 shows a scanning electron micrograph of the product of comparative Example 1.

FIG. 1 shows an optical micrograph of the reaction product, while FIG. 2 shows a scanning electron micrograph of the reaction product. Based on the measurements of at least 100 wires, the product had an average diameter of 123±34 nm.

Example 2

To a 500 mL reaction flask containing 280 mL EG, 1.1 mL of 7.7 mM $FeCl_2$ in EG and 1.0 mL of 7.3 mM $CoCl_2$ in EG was added. The reaction mixture was stirred and degassed with nitrogen using a glass pipette for 2 hrs. Stock solutions of 0.77 M PVP in EG and 0.25 M $AgNO_3$ in EG were also degassed with nitrogen for 60 min. 20 mL syringes of the PVP and $AgNO_3$ solutions were then prepared. The reaction mixture was heated to 145° C. under $N_2$ and, after the reaction mixture was held 10 minutes at the set point temperature, the $AgNO_3$ and PVP solutions were added at a constant rate over 25 minutes via a 12 gauge TEFLON® fluoropolymer syringe needle. The reaction mixture was held at 145° C. for 90 minutes, after which samples were taken for optical microscopy. The reaction mixture was then allowed to cool to ambient temperature. 15 mL of the cooled reaction mixture was diluted with 35 mL of isopropanol (IPA), centrifuged for 15 minutes at 1500 rpm, decanted, then re-dispersed in 5 mL IPA. The resulting mixture was sampled for scanning electron microscopy.

Figure 3:
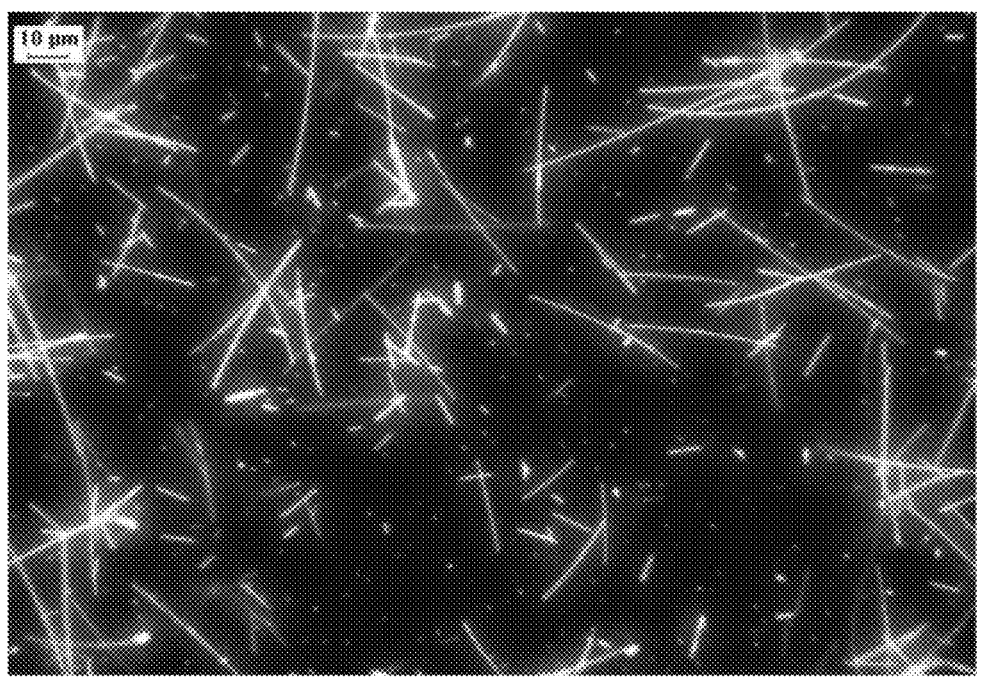
FIG. 3 shows an optical micrograph of the product of Example 2.
Figure 4:
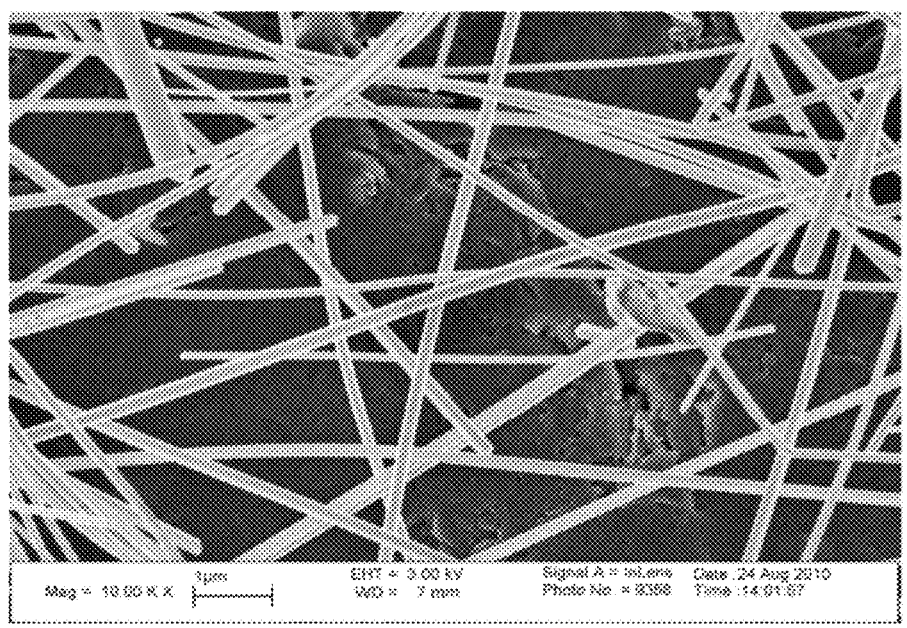
FIG. 4 shows a scanning electron micrograph of the product of Example 2.

FIG. 3 shows an optical micrograph of the reaction product, while FIG. 4 shows a scanning electron micrograph of the reaction product. Based on the measurements of at least 100 wires, the product had an average diameter of 160±58 nm. These wires were thicker than those of Example 1.

Example 3 (Comparative)

To a 500 mL reaction flask containing 280 mL EG, 2.0 g of 17 mM $GeCl_2$-dioxane in EG was added. The reaction mixture was stirred and degassed with nitrogen using a TEFLON® fluoropolymer tube for 2 hrs. Stock solutions of 0.84 M PVP in EG and 0.25 M $AgNO_3$ in EG were also degassed with nitrogen for 60 min. 20 mL syringes of the PVP and $AgNO_3$ solutions were then prepared. The reaction mixture was heated to 145° C. under 0.5 L/min $N_2$, then the $AgNO_3$ and PVP solutions were added at a constant rate over 25 minutes via a 12 gauge TEFLON® fluoropolymer syringe needle. The reaction mixture was held at 145° C. for 90 minutes, after the reaction mixture was allowed to cool to ambient temperature. 15 mL of the cooled reaction mixture was diluted with 35 mL of IPA, centrifuged for 15 minutes at 1500 rpm, decanted, then re-dispersed in 5 mL IPA.

Figure 5:
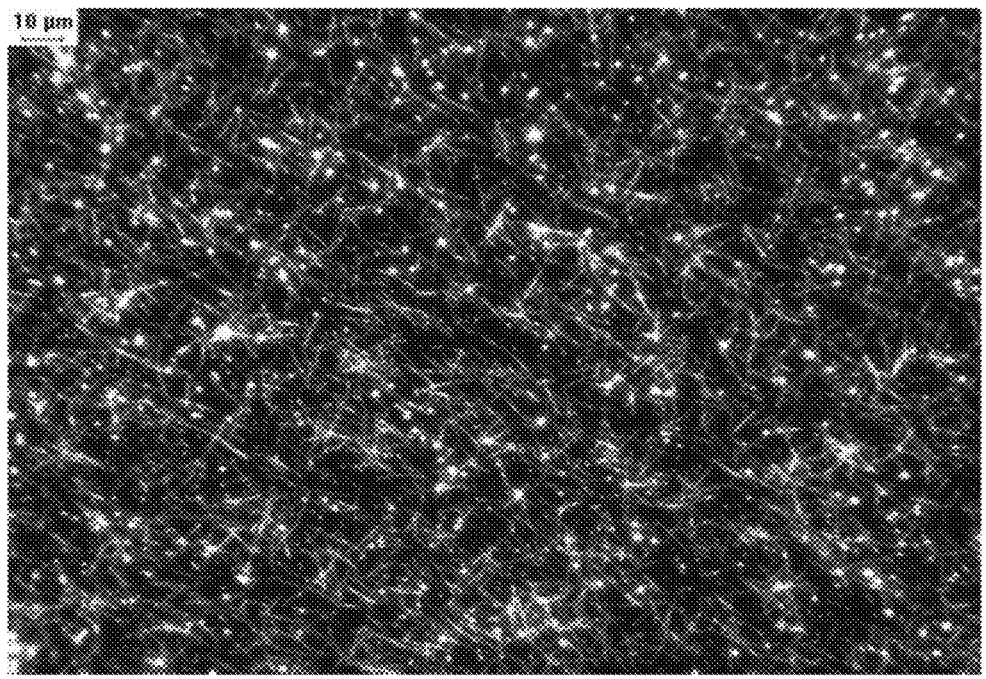
FIG. 5 shows an optical micrograph of the product of comparative Example 3.

FIG. 5 shows an optical micrograph of the reaction product, which had copious non-nanowire nanoparticles.

Example 4 (Comparative)

To a 500 mL reaction flask containing 280 mL EG, 4.4 g of 6.9 mM $SnCl_2$ in EG was added. The reaction mixture was stirred and degassed with nitrogen using a TEFLON® fluoropolymer tube for 2 hrs. Stock solutions of 0.84 M PVP in EG and 0.25 M $AgNO_3$ in EG were also degassed with nitrogen for 60 min. 20 mL syringes of the PVP and $AgNO_3$ solutions were then prepared. The reaction mixture was heated to 145° C. under 0.5 L/min $N_2$, then the $AgNO_3$ and PVP solutions were added at a constant rate over 25 minutes via a 12 gauge TEFLON® fluoropolymer syringe needle. The reaction mixture was held at 145° C. for 90 minutes, after the reaction mixture was allowed to cool to ambient temperature. 15 mL of the cooled reaction mixture was diluted with 35 mL of IPA centrifuged for 15 minutes at 1500 rpm, decanted, then re-dispersed in 5 mL IPA.

Figure 6:
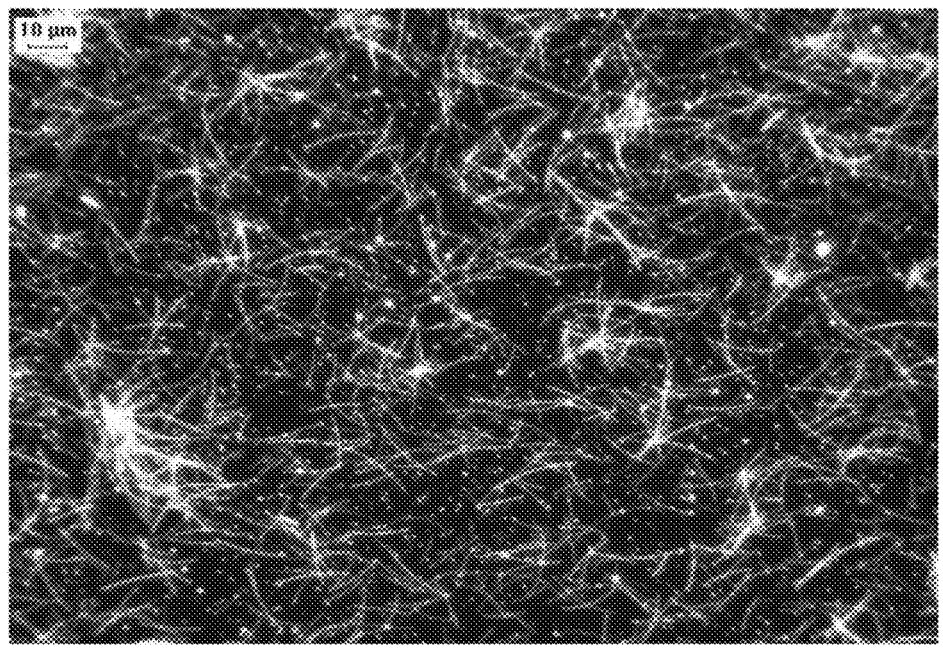
FIG. 6 shows an optical micrograph of the product of comparative Example 4.

FIG. 6 shows an optical micrograph of the reaction product, which had copious non-nanowire nanoparticles.

Example 5

To a 500 mL reaction flask containing 280 mL EG, 2.1 g of 9.3 mM $SnCl_2$ in EG and 1.4 g of freshly prepared 15 mM $GeCl_2$-dioxane in EG was added. The reaction mixture was stirred and degassed with nitrogen using a TEFLON® fluoropolymer tube for 2 hrs. Stock solutions of 0.84 M PVP in EG and 0.25 M $AgNO_3$ in EG were also degassed with nitrogen for 60 min. 20 mL syringes of the PVP and $AgNO_3$ solutions were then prepared. The reaction mixture was heated to 145° C. under 0.5 L/min $N_2$, then the $AgNO_3$ and PVP solutions were added at a constant rate over 25 minutes via a 12 gauge TEFLON® fluoropolymer syringe needle. The reaction mixture was held at 145° C. for 120 minutes, after the reaction mixture was allowed to cool to ambient temperature. 15 mL of the cooled reaction mixture was diluted with 35 mL of IPA centrifuged for 15 minutes at 1500 rpm, decanted, then re-dispersed in 5 mL IPA.

Figure 7:
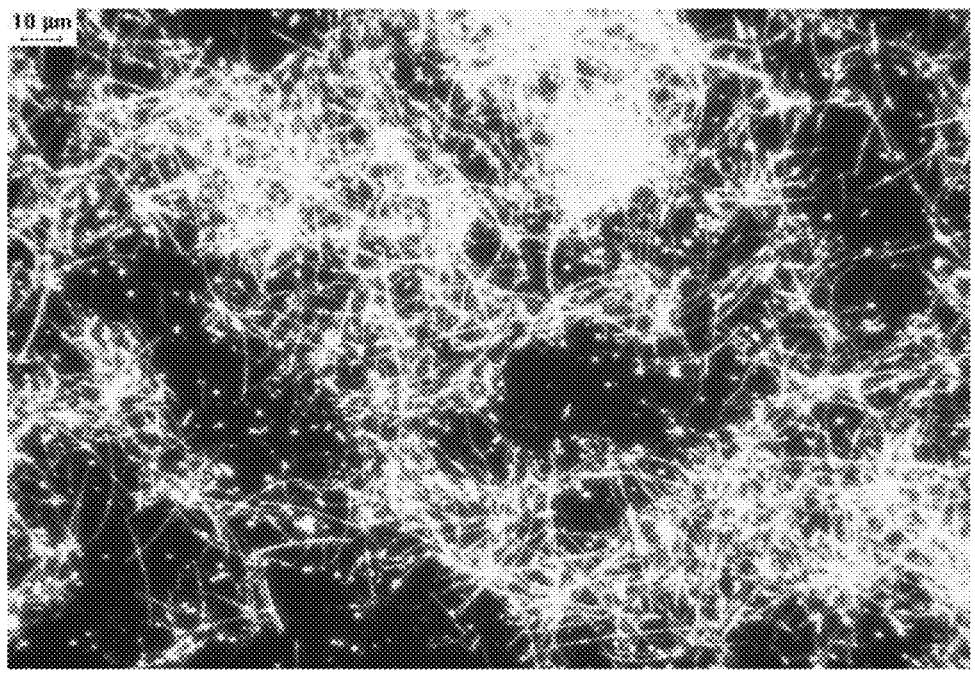
FIG. 7 shows an optical micrograph of the product of Example 5.

FIG. 7 shows an optical micrograph of the reaction product, which had fewer non-nanowire nanoparticles than either of the reaction products of comparative Examples 3 or 4. By comparing FIG. 7 to FIGS. 5 and 6, it is apparent that the $Sn^{2+}/Ge^{2+}$ mixed metal ion catalyst was more selective toward nanowire production than either of the equivalent molarity $Sn^{2+}$ or $Ge^{2+}$ non-mixed metal ion catalysts.

The invention has been described in detail with reference to particular embodiments, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A method of producing silver nanowires with reduced nanoparticle coproduction comprising:
   providing a composition comprising:
      a first molar quantity of silver ion,
      a second molar quantity of at least one second metal or metal ion, said at least one second metal or metal ion comprising germanium or an ion of germanium, and
      a third molar quantity of at least one third metal or metal ion, said at least one third metal or metal ion comprising tin or an ion of tin; and
   reducing the silver ion to silver nanowire,
   wherein the ratio of (1) the sum of the second molar quantity and the third molar quantity to (2) the first molar quantity is from about 0.0001 to about 0.1.

2. The method according to claim 1, wherein the composition further comprises at least one compound comprising silver ion.

3. The method according to claim 1, wherein the composition further comprises at least one solvent comprising at least one polyol.

4. The method according to claim 1, wherein the composition further comprises at least one of: one or more surfactants, one or more acids, or one or more polar polymers.

5. The method according to claim 1, wherein the at least one second metal or metal ion comprises the at least one second metal in its 0, +1, +2, +3, +4, +5, or +6 oxidation state.

6. The method according to claim 1, wherein the at least one third metal or metal ion comprises the at least one third metal in its 0, +1, +2, +3, +4, +5, or +6 oxidation state.

7. The method according to claim 1, wherein the ratio of the second molar quantity to the third molar quantity is from about 0.01 to about 100.

* * * * *